United States Patent [19]
Bailey et al.

[11] Patent Number: 5,651,126
[45] Date of Patent: Jul. 22, 1997

[54] METHOD AND APPARATUS FOR REDUCING TRANSITIONS ON COMPUTER SIGNAL LINES

[75] Inventors: Robert Bailey, San Jose; Brian D. Howard, Menlo Park; Michael D. Johnson, Campbell, all of Calif.

[73] Assignee: Apple Computer, Inc., Cupertino, Calif.

[21] Appl. No.: 904,735

[22] Filed: Jun. 26, 1992

[51] Int. Cl.$^6$ .................................. G06F 13/14
[52] U.S. Cl. .................... 395/401; 395/402; 395/416; 395/421.1; 365/233.5
[58] Field of Search .................. 365/189.05, 230.08, 365/227, 233.5; 395/400, 425, 325, 404, 401, 402, 416, 421.1, 421.09

[56] References Cited

U.S. PATENT DOCUMENTS

| | | | |
|---|---|---|---|
| 4,075,606 | 2/1978 | Wilkens | 340/147 |
| 4,695,952 | 9/1987 | Howland | 395/325 |
| 4,766,334 | 8/1988 | Warner | 307/540 |
| 4,806,794 | 2/1989 | Walters, Jr. | 307/451 |
| 4,879,693 | 11/1989 | Ferrant | 365/233 |
| 4,903,197 | 2/1990 | Wallace et al. | 395/425 |
| 4,972,374 | 11/1990 | Wang et al. | 365/205 |
| 5,042,002 | 8/1991 | Zink et al. | 395/375 |
| 5,086,407 | 2/1992 | McGarity et al. | 395/800 |
| 5,109,493 | 4/1992 | Banerjee | 395/325 |
| 5,179,678 | 1/1993 | Kawamura | 395/425 |
| 5,305,443 | 4/1994 | Franzo | 395/325 |
| 5,379,379 | 1/1995 | Becker et al. | 395/250 |

*Primary Examiner*—David K. Moore
*Attorney, Agent, or Firm*—Richard C. Liu

[57] ABSTRACT

A method and apparatus for eliminating unnecessary address transitions on an DRAM address bus and DRAM write enable line. In a known DRAM controller and DRAM array, all address transitions on the CPU address bus are mirrored by address transitions on the DRAM address bus. The present invention eliminates all address transitions not associated with an actual DRAM access cycle by eliminating the DRAM controller's address multiplexer and replacing it with a multiplexing driver circuit and a bus holder circuit. In a similar fashion, a DRAM write enable circuit eliminates all transitions on the DRAM write enable line that are not associated with actual DRAM access cycles. Although specifically discussed in terms of a DRAM array and its associated circuitry, the portion of the present invention that reduces address transitions on the DRAM address lines could be used in any device currently using a multiplexer.

6 Claims, 3 Drawing Sheets

METHOD AND APPARATUS FOR REDUCING TRANSITIONS ON COMPUTER SIGNAL LINES

BACKGROUND OF THE INVENTION

This invention is in the field of digital computers. In particular, it relates to battery powered portable computers and their memory subsystems.

One of the fastest growing areas in the computer industry is portable computers. Portable computers have grown both much lighter and much more capable over the past few years. One factor, however, which still limits their usefulness is the comparatively short length of time that such computers can operate using their internal battery power supply before requiring a recharge. Although research on new batteries promises batteries of much greater power density and consequently longer operating times, it is uncertain when these batteries will become available. Even when better batteries become available, the power they can supply will always remain a limiting resource, necessitating its conservation.

Given the uncertainty about the availability of new power sources, engineers designing portable computers have concentrated on reducing the power consumed by their computers, thereby extending battery life. Examples of such efforts include the many different types of "sleep" modes which have been incorporated into portable computers, which modes either turn off the computer's central processing unit ("CPU") when the computer is idle or reduce the computer's clock frequency during such idle periods, thereby also reducing power usage. Many other examples of power reduction efforts could be given.

One area that has so far remained resistant to such power use reduction efforts is the dynamic random access memory ("DRAM") array and the write-enable and multiplexed address lines that couple the DRAM array to the DRAM controller and the CPU. The address lines that couple these devices together are, as a general rule, relatively long, especially when compared to the signal path lengths within the devices. Also, as there are many individual DRAM devices in a DRAM array, the length and number of address lines is even greater. The capacitive load seen by the integrated circuit ("IC") driving a write enable or address line to the DRAM array is the trace capacitance of the line on the printed circuit ("PC") board, plus the sum of the input capacitances of the individual DRAM devices connected to that line, a sum that can be relatively large in the case of a large DRAM array. Each transition on a DRAM address or write enable line requires either charging or discharging the total capacitive load on that line. The power requirements of these charging/discharging operations are calculated using the following formula:

$$Power = Capacitance * Frequency * Voltage^2.$$

For a typical system, each DRAM access requires three DRAM address line transitions. With a system clock frequency of 25 MHz and each access requiring 5 clock cycles, the maximum rate of access is 5 MHz. Therefore, up to 15 million DRAM address line transitions can occur each second. With a voltage change of +/−5 volts and a line capacitance of about 300 picofarad, the amount of power used on a single line can equal up to 56 milliwatts. Given that there are currently 12 address lines to a typical multiplexed DRAM array, this quickly amounts to a significant amount of power. It should be noted that the number of address lines used in a DRAM array has increased with each new generation of DRAM memory.

Known computer systems allow the DRAM array's address and control lines to mirror every change which occurs on the CPU's address and read/write lines, even if these changes indicate accesses to devices other than the DRAM array. This practice causes many unnecessary, power wasting transitions on the DRAM control and address lines, especially considering the fact that only 25–35% of all system operations involve the DRAM array. In addition, the multiplexer which switches the DRAM address lines from the row to the column portion of the CPU address typically switches back to the row portion of the address at the end of each DRAM access cycle, which is yet another unnecessary transition on the DRAM address lines. The waste of power that these unnecessary DRAM address line transitions represents will only become worse in new computer systems as both the clock frequency and the number of DRAM address lines of such systems continues to increase.

Although engineers have been aware of the power wasting nature of these unnecessary DRAM address line transitions, attempts to reduce them have not been successful. One problem has been that most engineers assumed that a great deal of extra circuit logic would have to be used to eliminate the unnecessary transitions. Unfortunately, such logic would introduce timing delays in generating the needed control signals. Such timing delays would not be acceptable in an optimized DRAM controller. The inventors are not aware of any other proposed solution to this problem which will not have a negative impact on system performance.

SUMMARY OF THE INVENTION

The present invention, in a first preferred embodiment, comprises a transition optimizing circuit for the DRAM address lines and a transition optimizing circuit for the DRAM write enable line. The circuit for the DRAM address lines eliminates the multiplexer in known DRAM controllers and replaces it with a bus holder circuit. When the CPU accesses the DRAM array, a driver circuit forces the row address and then the column address onto the DRAM address lines. After the row address is forced onto the lines, the bus holder circuit maintains the value while the row address driver is tri-stated and until the column address is in turn forced onto the address lines. When the column address is forced onto the lines, the column address is in turn maintained by the bus holder circuit while the column address driver is tri-stated. This column address is maintained until the next time the CPU accesses the DRAM array, eliminating the unnecessary transition back to the row address which occurs in known DRAM controllers and DRAM arrays. In addition, as noted, no address transitions occur on the DRAM address lines except during actual DRAM access cycles.

The transition optimizing circuit for the DRAM write enable line fulfills a similar purpose, allowing a transition on the DRAM write enable line only when an actual DRAM access cycle is occurring.

The present invention will now be described in detail with reference to the figures listed and described below.

DETAILED DESCRIPTION OF THE PREFERRED EMBODIMENT

Embodiments of the present invention will be described by using specific electronic components. However, those of ordinary skill in the art, once understood the various functions to be carried out by the present invention will be able to implement the necessary logic for various logic devices or custom designed integrated circuits in suitable technologies without undue experimentation. For example, any specific reference to an inverter in an embodiment in the following description may very well be understood to be representative of other embodiments which include functionally equivalent devices including a non-inverter.

Figure 1:
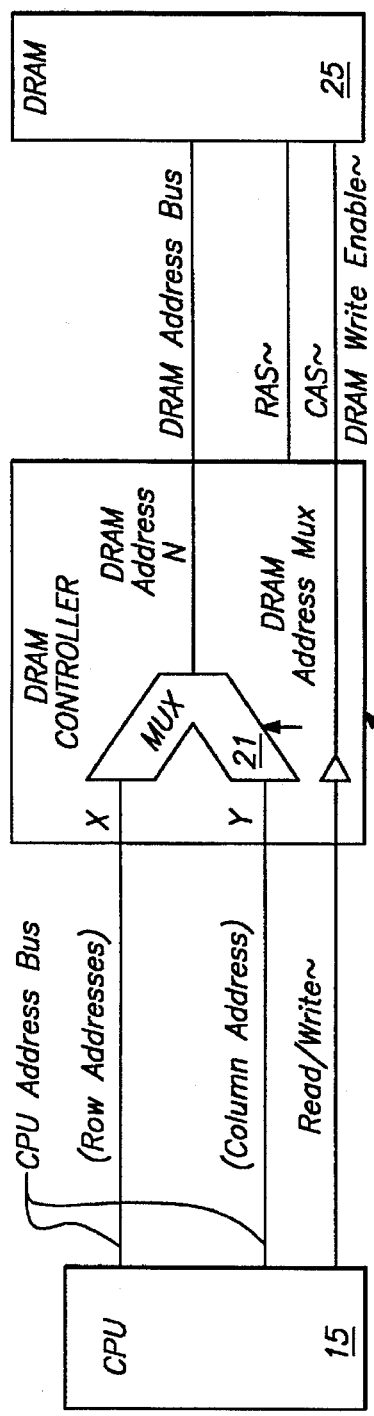
FIG. 1 is a simplified block diagram of a typical CPU, DRAM controller, and its DRAM array (prior art)

FIG. 1 is a simplified block diagram showing the basic elements of a typical known computer system. System 10 comprises CPU 15, DRAM controller 20 and DRAM array 25, the latter represented by only a single block. DRAM controller 20 further comprises multiplexer ("Mux") 21, which receives a DRAM Address Mux signal generated internally by the controller. For purposes of this disclosure, only those connections between the circuit elements which are germane to the subject matter of the present invention are illustrated in FIG. 1. These lines are a 32-bit address bus between CPU 15 and DRAM controller 20, a Read/Write~ control line between CPU 15 and DRAM controller 20, a multiplexed 12-bit address bus coupling DRAM controller 20 and DRAM array 25, along with a Row Address Strobe ("RAS~") line, a Column Address Strobe ("CAS~") line and a DRAM Write Enable~ line. As the system shown in FIG. 1 is only representative, the exact number of bits in the various buses is not meant to be definitive.

In the known art, the DRAM controller receives a 32-bit address from the CPU. The DRAM array, however is accessed by a 12-bit address bus. Therefore, the lower 24 bits of the CPU address are multiplexed into a row address and a column address, both of which are needed to access the DRAM array. The upper 8 bits of the CPU address indicate that the DRAM array is being accessed. This multiplexing function is performed by multiplexer 21 incorporated into DRAM controller 20. The proper timing of the RAS~ and CAS~ signals in relation to the DRAM Address Mux signal controls access to the DRAM array.

Figure 2:
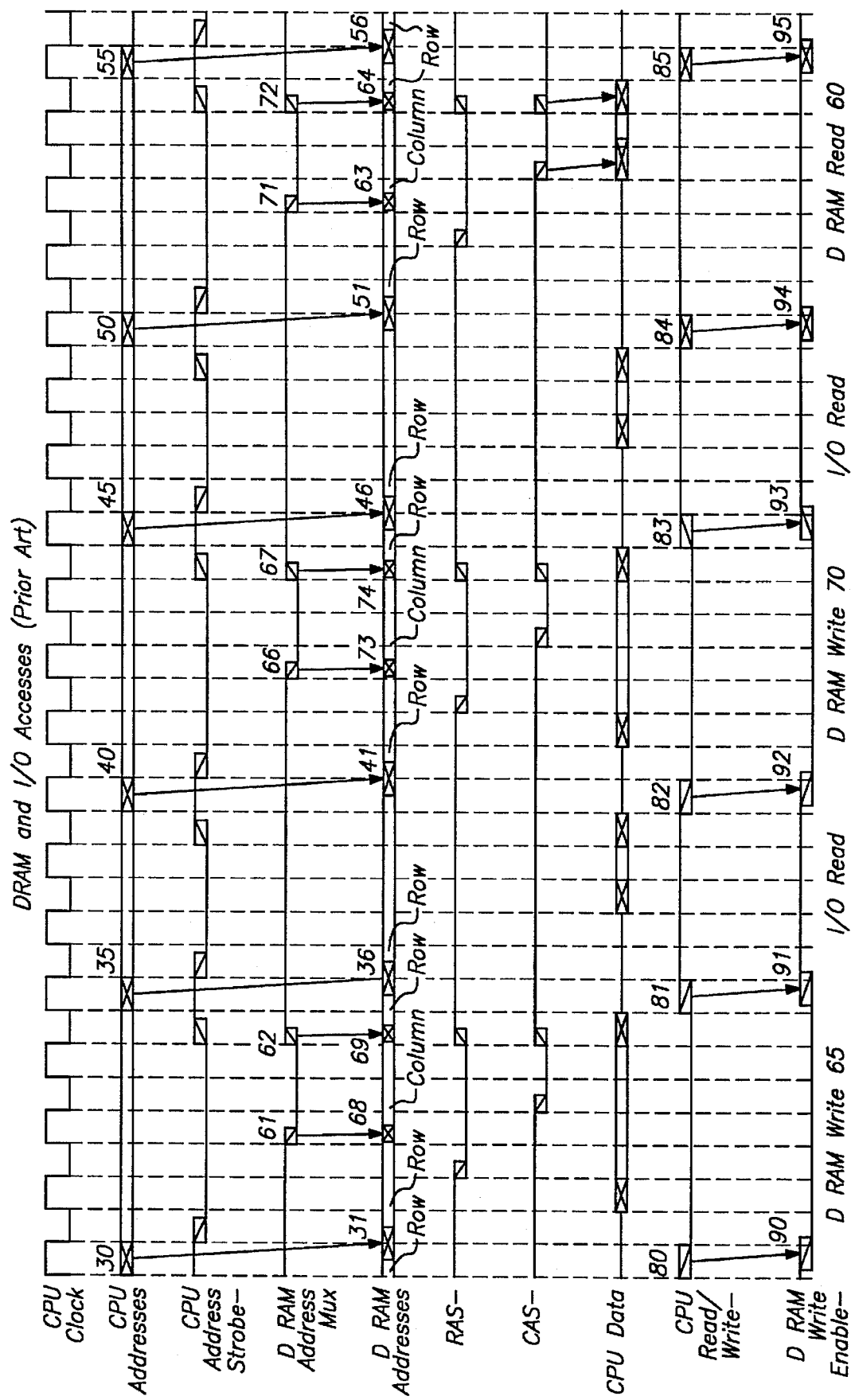
FIG. 2 is a timing diagram showing the various signal transitions on the address and control lines between the CPU, DRAM controller and DRAM array for the circuit illustrated in FIG. 1 (prior art)

FIG. 2 is a timing diagram which illustrates the various signal transitions which occur on the lines and buses of the system illustrated in FIG. 1 during a DRAM access cycle. As shown by signal transition pairs 30 and 31, 35 and 36, 40 and 41, 45 and 46, 50 and 51, and 55 and 56, every time the CPU places an address on its address bus, the row portion of that address is reflected on the multiplexed DRAM address bus. During each of DRAM read operation 60 and DRAM write operations 65 and 70, the DRAM Address Mux signal transitions twice, first to place the column address on the DRAM address bus and second to restore the row address on the DRAM address bus. These multiplexer transitions are indicated at 61 and 62, 66 and 67, and 71 and 72. These signals in turn cause signal transitions 68 and 69, 73 and 74, and 63 and 64 on the DRAM address bus. From the figure, the three address signal transitions that occur with each DRAM access cycle are clear, as is the transition that occurs with each non-DRAM access.

It should also be noted from FIG. 2 that every CPU Read/Write~ control line transition (80 through 85) is mirrored by a DRAM Write Enable~ control line transition (90 through 95). As only three of these signal transitions occur during an actual DRAM access cycle, the other two signal transitions are wasted. Although the transitions illustrated in FIG. 2 are accurate, the frequency of DRAM access cycles is overstated. On average, only 25% of CPU address bus transitions relate to the DRAM array, making the number of signal transitions wasted on non-DRAM accesses even higher than indicated in FIG. 2.

Figure 3:
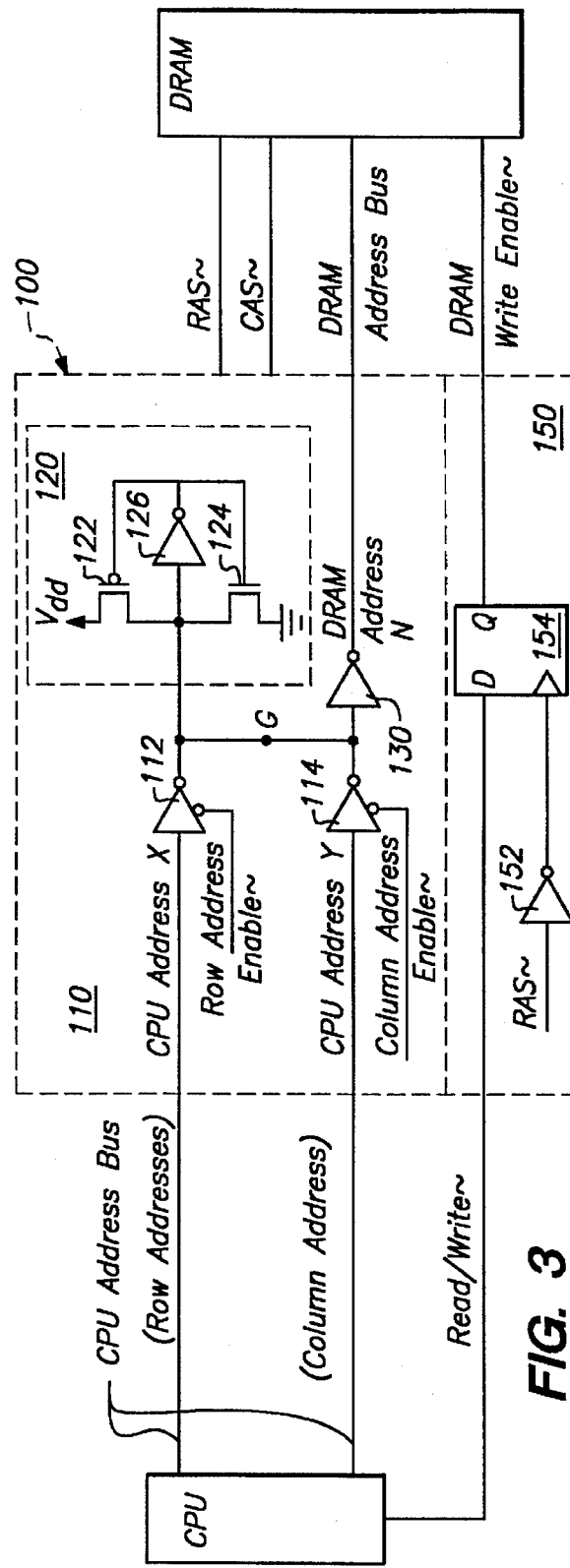
FIG. 3 is a logic diagram illustrating a first embodiment of the present invention.

The first embodiment of the present invention comprises a transition optimizing circuit for DRAM addresses and a transition optimizing circuit for the DRAM Write Enable~ line, both illustrated in FIG. 3.

Transition optimizing circuit for DRAM addresses 100 replaces multiplexer 21 shown in FIG. 1. Circuit 100, in this first embodiment, comprises address node driver 110, bus holder circuit 120, and address line driver 130. Address node driver 110 is further comprised of gates 112 and 114 and bus holder circuit 120 is further comprised of transistors 122, 124 and inverter 126. The circuits shown in FIG. 3 are duplicated for each separate DRAM address line in the DRAM array.

The CPU address lines that must be multiplexed to drive a given DRAM address line for a DRAM access are labeled CPU address X and CPU address Y and transmit, respectively, the row and column addresses. At the beginning of the row address portion of the DRAM access cycle, the signal Row Address Enable~ goes low. In turn, the output of gate 112 overdrives node G so that the value on the CPU address X line appears on the output of address line driver 130, which is the DRAM Address N line. "N" is used merely to indicate that the illustrated line is only one of a plurality of such address lines. The output of inverter 126 turns on transistor 122 if node G is high or transistor 124 if node G is low.

When the Row Address Enable~ signal then goes high, the output of gate 112 is tri-stated. At this point, either transistor 122 or 124 continues to hold the previous value driven by gate 112 onto node G.

At the beginning of the column address portion of the DRAM access cycle, the signal Column Address Enable~ goes low, causing the output of gate 114 to overdrive node G so that the value on the CPU Address Y line appears at the output of address line driver 130 as DRAM Address N. The output of inverter 126 again turns on transistor 122 if node G is high or turns on transistor 124 if node G is low. The Column Address Enable~ then goes high, causing gate 114 to tri-state its output. As before, either transistor 122 or 124 continues to hold node G at the value previously driven by gate 114.

As transistors 122 and 124 have only a small drive capability, they can only maintain the value on node G when all other driving outputs have been tri-stated. As they can be easily overdriven by either gate 112 or 114, the value on node G can be changed without excessive power consumption.

It should be noted that the output of address line driver 130 (DRAM Address N) reflects the value at the CPU Address X or Y lines only during the brief period of time when the output of either gate 112 or 114 is enabled. At all other times, changes on the CPU address bus have no effect on the DRAM address bus lines. This reduces the transitions on the DRAM address bus lines to just two for every DRAM access, with no transitions occurring during other cycles.

Also, as the logic circuitry needed to reduce the number of address transitions is so simple, being fabricated as part of the DRAM controller and replacing the traditional multiplexer, there is very little speed penalty for this reduction in address transitions. In fact, the change from row to column address, as determined by the output enable time for gate 114, is faster than in known DRAM controllers having a multiplexer.

The transition optimizing circuit for the DRAM Write Enable~ line is also illustrated in FIG. 3. Circuit 150 is comprised of inverter 152 and flip-flop 154. As in known DRAM circuits, the DRAM Write Enable~ line must be driven low to write to the DRAM and high to read from the DRAM, correctly timed to the DRAM access cycle. At the time in the DRAM cycle when the RAS~ signal to the DRAM is driven low, the value present on the CPU Read/Write~ line is latched by flip-flop 154 and driven onto the DRAM Write Enable~ line. At all other times, the value on the CPU Read/Write~ line has no effect on the DRAM Write Enable~ line. This reduces the transitions on the DRAM Write Enable~ to just one at the beginning of each actual DRAM access cycle, with no address transitions occurring for any other cycles. For systems in which the processor generates separate Read~ and Write~ strobes, instead of the Read/Write~ line described, the value present on the Write~ strobe line can be latched at RAS~ time. It should be noted that the RAS~ signal was chosen herein only as a convenient point in a DRAM access cycle to latch the CPU Read/Write value. Any other appropriate point in the DRAM access cycle could also be used.

Figure 4:
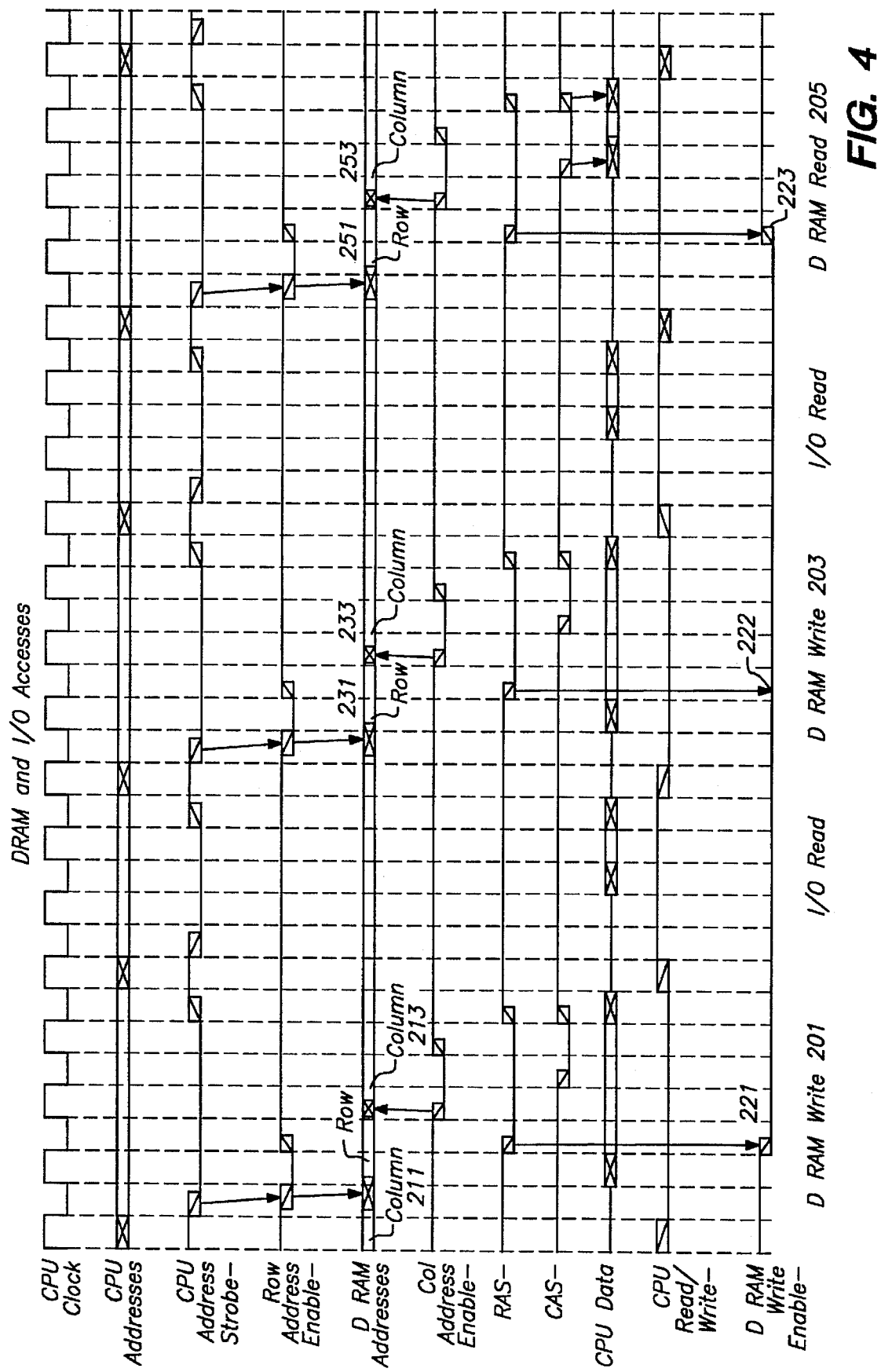
FIG. 4 is a timing diagram showing the signal transitions which occur in the first embodiment of the present invention.

FIG. 4 is a timing diagram of the CPU and DRAM controller signals used in a computer system incorporating the present invention. As shown in FIG. 4, DRAM writes 201 and 203, as well as DRAM read 205, each involve only two transitions on the DRAM address bus (see 211 and 213, 231 and 233, and 251 and 253, respectively). It is equally important to notice the absence of address transitions during cycles that do not access the DRAM and the replacement of the DRAM address multiplexer signal (shown in FIG. 2) by a Row Address Enable~ and a Column Address Enable~ signal. Also note that the DRAM Write Enable~ line transitions only during an actual DRAM access cycle (see 221 and 223). No transition appears at 222 because the value latched during DRAM write 203 is the same as the value latched previously, during DRAM write 201.

Although the invention has been explained with reference to the foregoing first preferred embodiment, it should be apparent to one skilled in the art that numerous changes and modifications may be made thereto without departing from the scope or spirit of the invention. In particular, the present invention can be easily incorporated into a non-portable computer system. Although power saving in such computers is not as critical, each transition eliminated reduces the waste heat generated by the computer system. As such waste heat shortens the life of the various system components, reducing it is an unmitigated benefit. Also, as the number of address transitions on the long, high capacitance address lines is greatly reduced, electromagnetic interference is reduced. The techniques described in this invention may also be used to minimize signal transitions in any other part of a computer, not limited to DRAM arrays. Furthermore, the node driver and bus holder techniques described herein can be used to replace any multiplexer used in the known art. Other changes, modifications and applications of the invention will become apparent to one skilled in the art in view therefore of this disclosure. Thus, the invention should be limited only in accordance with the appended claims.

What is claimed is:

1. In a computer system comprising a processor, a memory controller coupled to the processor by a read/write line and a processor address bus including row and column address lines, a memory unit coupled to the memory controller by a memory address bus and memory read/write line, the memory controller having a circuit for eliminating unnecessary transitions on the memory address bus and memory read/write line, the circuit comprising:

first means for reducing memory address bus transitions, said first means being coupled to the memory address bus and the processor address bus for maintaining a value previously driven on the memory address bus while tri-stating the memory controller until the processor initiates a subsequent memory read/write operation, said first means further comprising:

a plurality of pairs of row and column inverter means, the row and column inverter means each having an input and an output, the number of pairs being equal to a number of bits in the memory address bus, the inputs of the row and column inverter means being coupled respectively to the row and column address lines in the processor address bus, each row inverter being controlled by a row address enable signal and each column inverter being controlled by a column address enable signal;

a plurality of output inverter means, each output inverter means having an input and an output, the inputs of each output inverter means being coupled to the outputs of a pair of row and column inverter means and the outputs of the output inverter means forming the memory address bus; and a plurality of bus holder circuit means, one bus holder circuit means being coupled to the outputs of a pair of row and column inverter means, for maintaining an output driven by one of the pair of row and column inverter means, said each bus holder circuit means comprising:

a first P-channel transistor with a gate, source, and drain;

a first N-channel transistor with a gate, source and drain; and a bus inverter means with an input and output, the gates of the N-channel and P-channel transistors being coupled together and to the output of the inverter means, the drain of the P-channel transistor and the drain of the N-channel transistor being coupled to the input of the inverter means, the source of the P-channel transistor being coupled to a source of positive voltage and the source of the N-channel transistor being coupled to a ground voltage potential, said input of the bus inverter means being coupled to the outputs of the pair of row and column inverter means and being further coupled to the input of the output inverter means; and second means for reducing write enable line transition, said second means being coupled to the memory write enable line and the processor read/write line for maintaining a value on a memory write enable line until the processor initiates a subsequent memory read/write operation.

2. A memory controller for controlling a memory unit in an electronic system, said memory unit being addressed by a row and a column address and further being coupled to said memory controller by a memory address bus providing a passing path for signals indicative of said row and column addresses, said memory controller having a circuit for eliminating unnecessary address transitions on said memory address bus, said circuit comprising:

means for reducing memory address bus transitions, said means being coupled to the memory address bus for maintaining a value previously driven on the memory address bus while tri-stating the memory controller until the memory controller begins a subsequent memory read/write operation, said means further comprising:

a plurality of pairs of row and column inverter means associated with said memory address bus for receiving said signals, the row and column inverter means each having an input and an output, the number of pairs being equal to a number of bits in the memory address bus;

a plurality of output inverter means, each output inverter means having an input and an output, the inputs of each output inverter means being coupled to the outputs of a pair of row and column inverter means and the outputs of the output inverter means forming the memory address bus; and a plurality of bus holder circuit means, one bus holder circuit means being coupled to the outputs of a pair of row and column inverter means, for maintaining an output driven by one of the pair of row and column inverter means, said each bus holder circuit means comprising:

a first P-channel transistor with a gate, source, and drain;

a first N-channel transistor with a gate, source and drain; and a bus inverter means with an input and output, the gates of the N-channel and P-channel transistors being coupled together and to the output of the inverter means, the drain of the P-channel transistor and the drain of the N-channel transistor being coupled to the input of the inverter means, the source of the P-channel transistor being coupled to a source of positive voltage and the source of the N-channel transistor being coupled to a ground voltage potential, said input of the bus inverter means being coupled to the outputs of the pair of row and column inverter means and being further coupled to the input of the output inverter means.

3. In a computer system comprising a processor, a memory controller coupled to the processor by a read/write line and a processor address bus including row and column address lines, a memory unit coupled to the memory controller by a memory address bus and memory read/write line, the memory controller having a circuit for eliminating unnecessary transitions on the memory address bus and memory read/write line, the circuit comprising:

first means for reducing memory address bus transitions, said first means being coupled to the memory address bus and the processor address bus for maintaining a value previously driven on the memory address bus while tri-stating the memory controller until the processor initiates a subsequent memory read/write operation, said first means further comprising:

a plurality of pairs of row and column inverter means, the row and column inverter means each having an input and an output, the number of pairs being equal to a number of bits in the memory address bus, the inputs of the row and column inverter means being coupled respectively to the row and column address lines in the processor address bus, each row inverter being controlled by a row address enable signal and each column inverter being controlled by a column address enable signal;

a plurality of bus holder circuit means, one bus holder circuit means being coupled to the outputs of a pair of row and column inverter means, for maintaining an output driven by one of the pair of row and column inverter means; and a plurality of output inverter means, each output inverter means having an input and an output, the inputs of each output inverter means being coupled to the outputs of a pair of row and column inverter means and the outputs of the output inverter means forming the memory address bus; and second means for reducing write enable line transition, said second means being coupled to the memory write enable line and the processor read/write line for maintaining a value on a memory write enable line until the processor initiates a subsequent memory read/write operation.

4. The circuit of claim 3 wherein the row and column inverter means and the output inverter means comprise non-inverting drivers.

5. A memory controller for controlling a memory unit in an electronic system, said memory unit being addressed by a row and a column address and further being coupled to said memory controller by a memory address bus providing a passing path for signals indicative of said row and column addresses, said memory controller having a circuit for eliminating unnecessary address transitions on said memory address bus, said circuit comprising:

means for reducing memory address bus transitions, said means being coupled to the memory address bus for maintaining a value previously driven on the memory address bus while tri-stating the memory controller until the memory controller begins a subsequent memory read/write operation, said means further comprising:

a plurality of pairs of row and column inverter means associated with said memory address bus for receiving said signals, the row and column inverter means each having an input and an output, the number of pairs being equal to a number of bits in the memory address bus;

a plurality of bus holder circuit means, one bus holder circuit means being coupled to the outputs of a pair of row and column inverter means, for maintaining an output driven by one of the pair of row and column inverter means; and a plurality of output inverter means, each output inverter means having an input and an output, the inputs of each output inverter means being coupled to the outputs of a pair of row and column inverter means and the outputs of the output inverter means forming the memory address bus.

6. The circuit of claim 5 wherein the row and column inverter means and the output inverter means comprise non-inverting drivers.

\* \* \* \* \*